US012384191B1

(12) United States Patent
Hassan

(10) Patent No.: US 12,384,191 B1
(45) Date of Patent: Aug. 12, 2025

(54) CARD-SHAPED PEN

(71) Applicant: Alishan Hassan, Great Falls, VA (US)

(72) Inventor: Alishan Hassan, Great Falls, VA (US)

(73) Assignee: Alishan Hassan, Great Falls, VA (US)

( * ) Notice: Subject to any disclaimer, the term of this patent is extended or adjusted under 35 U.S.C. 154(b) by 0 days.

(21) Appl. No.: 18/440,946

(22) Filed: Feb. 13, 2024

(51) Int. Cl.
*B43K 5/16* (2006.01)
*B43K 24/04* (2006.01)

(52) U.S. Cl.
CPC ................ *B43K 5/16* (2013.01); *B43K 24/04* (2013.01)

(58) Field of Classification Search
CPC . B43K 5/16; B43K 7/12; B43K 24/00; B43K 24/02; B43K 24/04; B43K 24/10; B43K 24/12; B43K 29/007; B43K 29/00
USPC .............................................. 401/6, 109, 117
See application file for complete search history.

(56) References Cited

U.S. PATENT DOCUMENTS

| | | | | | |
|---|---|---|---|---|---|
| 4,706,995 | A * | 11/1987 | Dopp | B43K 29/00 | 401/6 |
| 5,678,939 | A * | 10/1997 | Ross | B43K 23/12 | 401/6 |
| 5,897,261 | A * | 4/1999 | Goetz | B43K 5/005 | D19/182 |
| 2005/0254881 | A1* | 11/2005 | Zhang | B43K 7/02 | 401/131 |
| 2008/0063462 | A1* | 3/2008 | Steinschaden | B43K 5/16 | 401/195 |

* cited by examiner

*Primary Examiner* — David J Walczak

(57) ABSTRACT

A card shaped pen (13) with retractable pen tips designed to be stored in the card slot of a wallet, purse, and other credit card or business card holders. The shape is optimized to make it easy to slide in and out of a card slot and to make it comfortable for a user to hold. Each of the pen tips (7) have their own ink cartridge and sliding switches, enabling the use of multiple colors in the pen. Each pen tip is extended and retracted using its sliding switch (1), which locks in the fully open and fully closed positions. Thus a versatile pen is provided—that can be conveniently carried on person every day.

1 Claim, 4 Drawing Sheets

CARD-SHAPED PEN

CROSS-REFERENCE TO RELATED APPLICATIONS

None.

FEDERALLY SPONSORED RESEARCH AND DEVELOPMENT

None.

JOINT RESEARCH AGREEMENT

None.

REFERENCE TO A "SEQUENCE LISTING", A TABLE, OR A COMPUTER PROGRAM LISTING APPENDIX SUBMITTTED ON A COMPACT DISC AND AN INCORPORATION-BY-REFERENCE OF THE MATERIAL ON THE COMPACT DISC

None.

SUMMARY OF THE INVENTION

This is a card shaped pen that has been primarily designed to be stored in the card slot of a wallet, purse, and other credit card or business card holders. It has four retractable pen tips that are each extended and retracted using a dedicated sliding switch. The switch locks the pen tips in their fully extended and fully retracted states. The cartridges for each of the pen tips can be filled with any ink color. The switches are colored to let the user know what ink color is in the respective cartridges.

The pen is 3 inches in length, 2.125 inches in height, and 0.165 inches in depth. It is sized such that the length is slightly smaller than a credit card so that it slides more easily into a card slot. The edges are curved and the corners with the pen tip holes are rounded for easier stowage and greater comfort for the user.

DETAILED DESCRIPTION OF THE INVENTION

Figure 1:
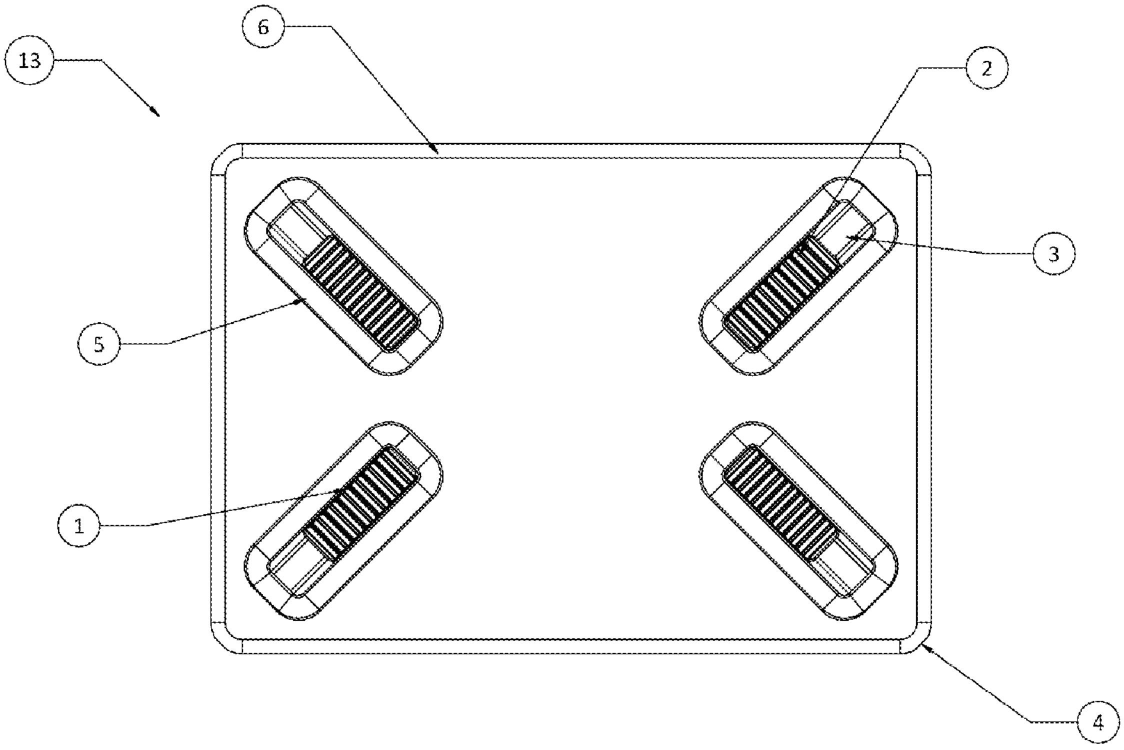
FIG. 1 is a front view of the pen, showing the four switches that extend and retract the pen tips.
Figure 2:
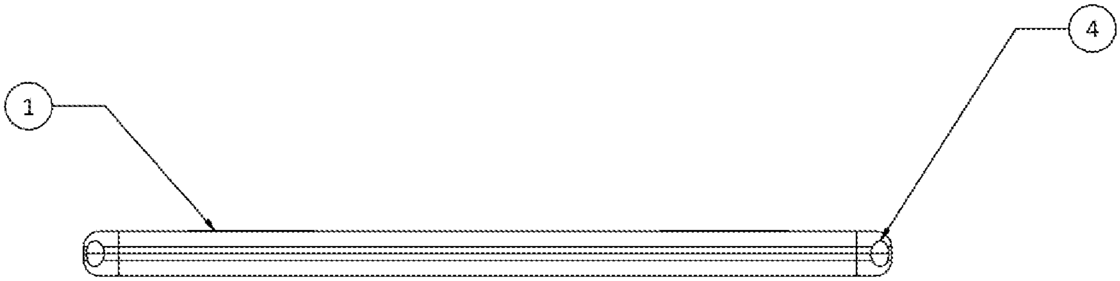
FIG. 2 shows the long side of the pen.
Figure 3:
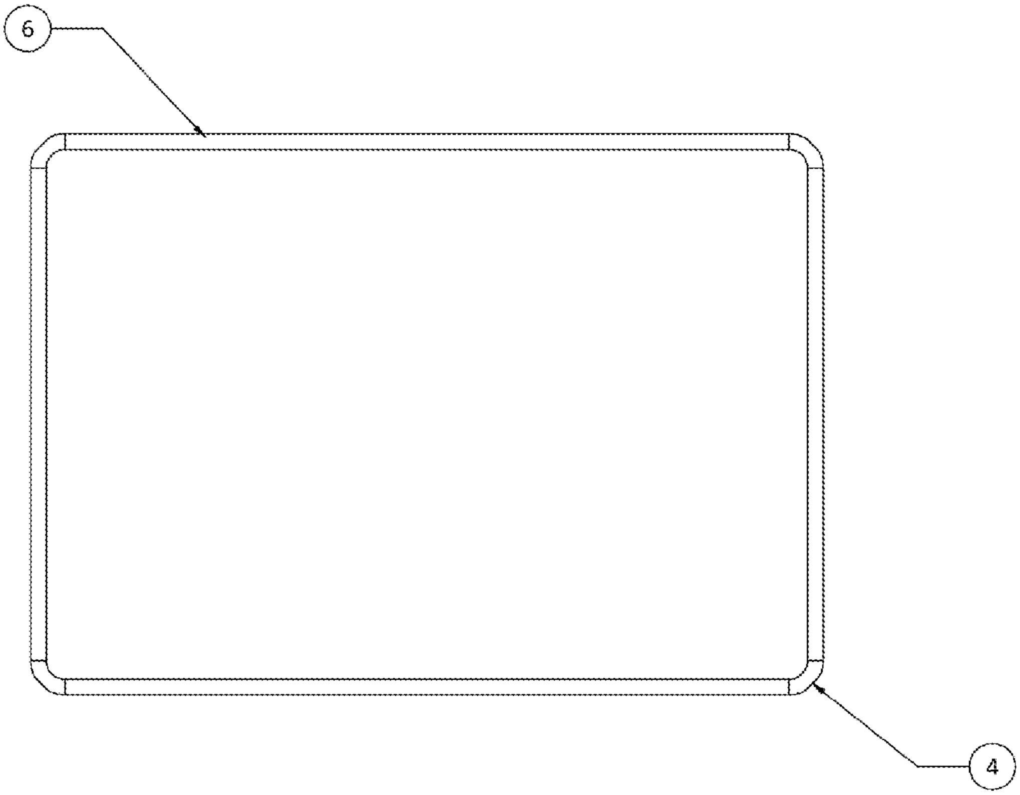
FIG. 3 is a back view of the pen.
Figure 4:
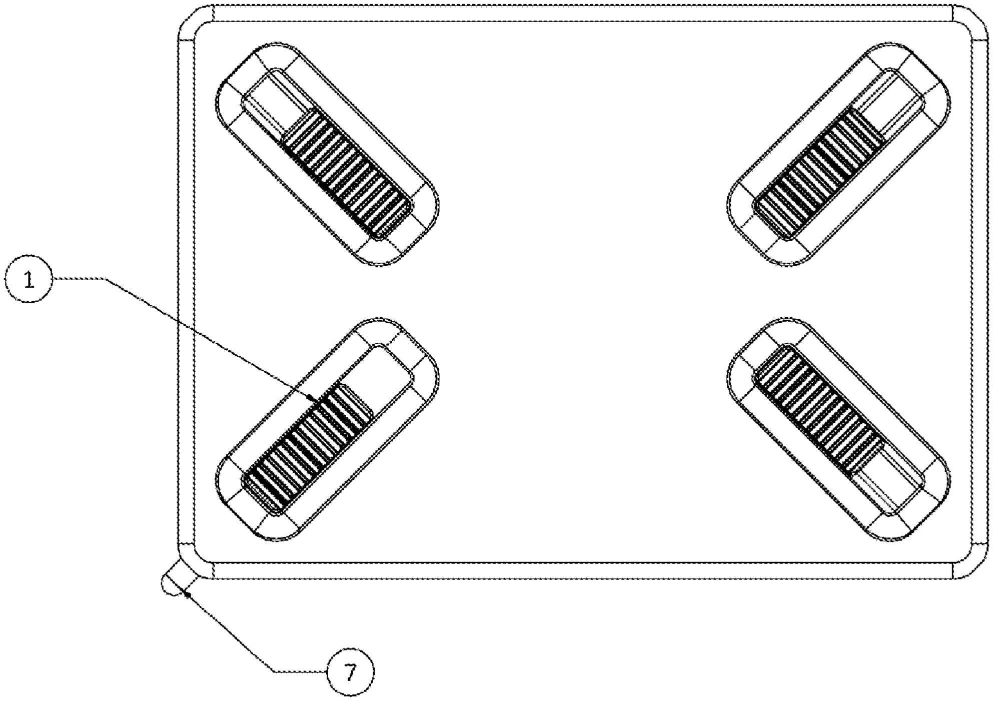
FIG. 4 shows one of the pen tips extended by moving one of the switches.
Figure 5:
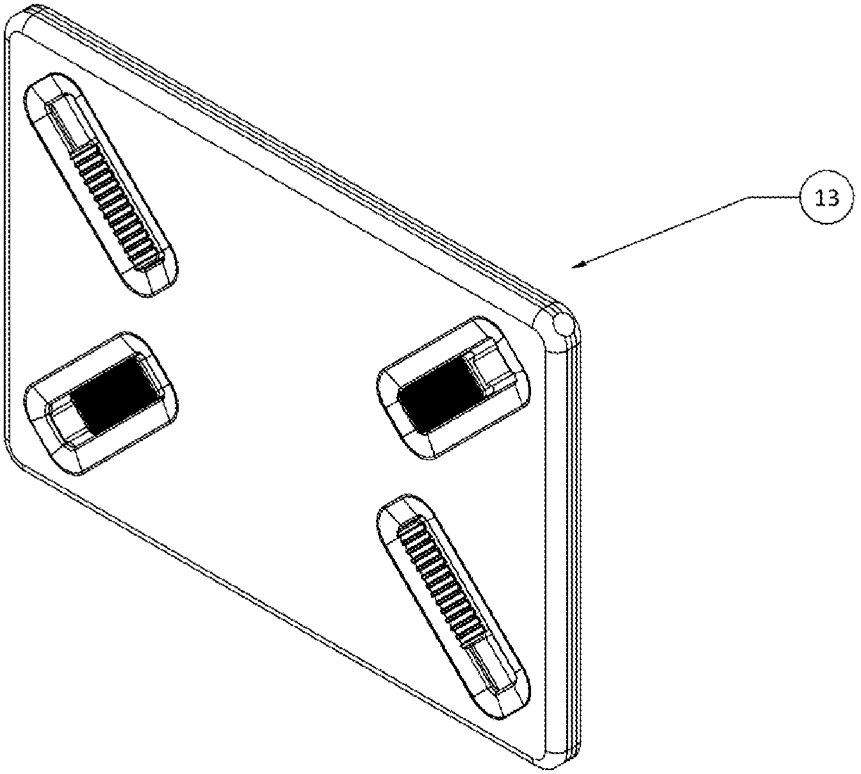
FIG. 5 is an isometric view of the pen.

FIG. 1 is a front view of the pen 13 with all of the tips in their retracted positions. One of the sliding switches 1 is used to extend its pen tip 7 through an opening hole 4 as shown in FIG. 4. Each of the sliding switches 1 extend and retract their respective pen tips 7. The sliding switches 1 sit flush with the face of the pen. They have grooves 2 to allow for better grip with the user's fingertips, or to make it easier to use a fingernail to slide the switch 1. There is a depression 5 around each of the switches 1 for added comfort and ease of use. The edges 6 of the pen are rounded off to make it easier to slide the pen in and out of a card slot and to increase user comfort.

The pen tips 7 have a cartridge containing ink attached to their rear. The cartridges are tubes housed inside the switches 1, taking up most of the length of the switches 1. The cartridges and pen tips 7 move with the switch from their fully retracted to fully extended positions. The cartridges are covered 3 by the switches so that they don't become exposed when the pen tips 7 are retracted.

Figure 6:
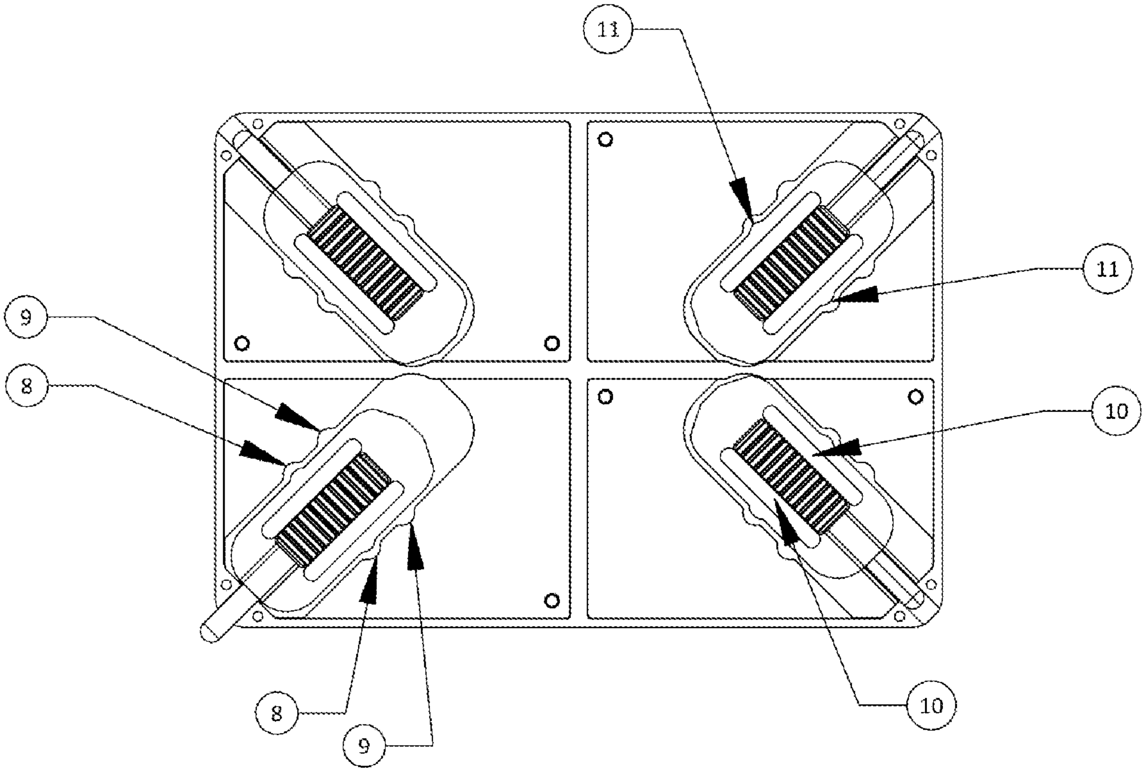
FIG. 6 removes the top of the body shell and shows the mechanical design of the switches.
Figure 7:
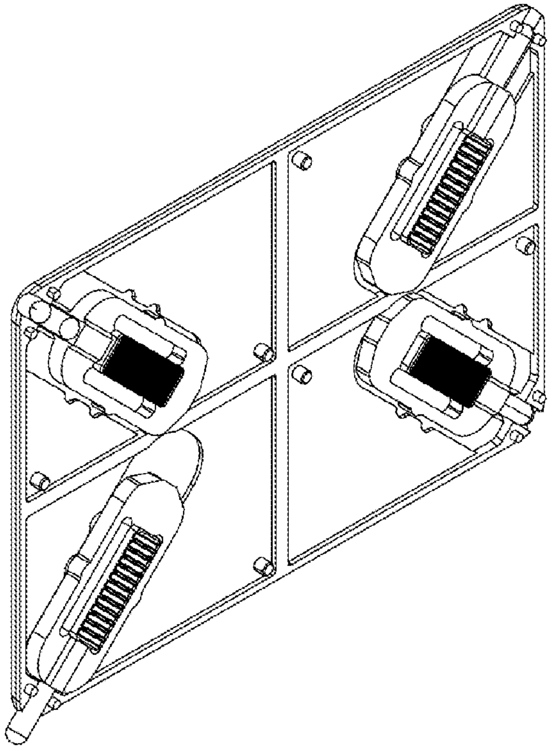
FIG. 7 is an isometric view of the internals of the pen with the top of the body shell removed.
Figure 8:
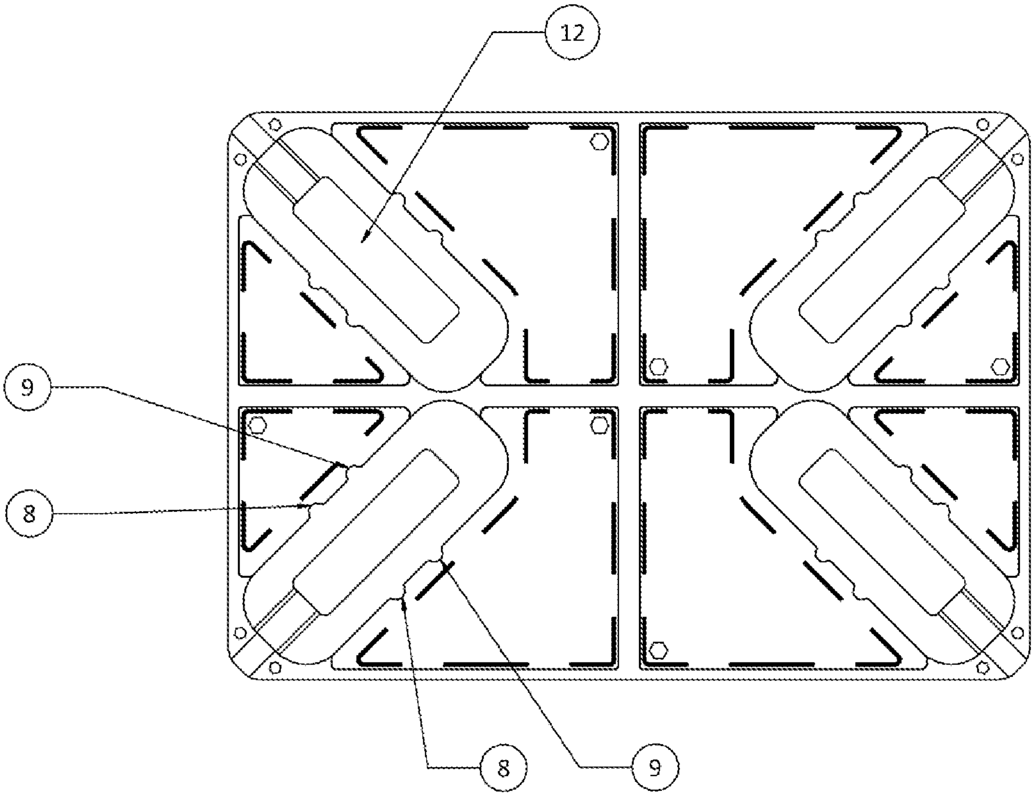
FIG. 8 shows the internal design of the top of the body shell.

FIG. 6 and FIG. 7 show the inside of the pen 13 with the top half of the body removed (shown in FIG. 8). This shows the switch mechanism inside. Each side of the switch 1 has a leaf spring 10. In the center of the leaf spring 10, there's a rounded protrusion 11 that locks into rounded notches for the fully extended 8 and fully retracted 9 states of the pen tip. When the user slides the switch, the protrusions 11 are pushed against the notches, forcing the leaf springs 10 to compress, thereby allowing the switch 1 to move between its two states.

The top half of the pen shown in FIG. 8 has an opening 12 for each of the switches 1, and combines with the bottom half to guide the switches in a linear path.

The invention claimed is:

1. A writing instrument comprising:

a card shaped housing having first and second opposing walls and a side edge connecting the first and second opposing walls such that the housing defines a plurality of corners along the side edge;

a plurality of depressions in the first opposing wall wherein each depression is positioned adjacent one of the corners of the housing;

a plurality of writing elements slidably positioned within the housing wherein each writing element is extendable from a respective opening in one of the corners of the housing to an extended position and retractable into the respective opening to a retracted position;

a slide switch positioned within each of the depressions such that an upper surface of each slide switch does not extend above an upper surface of the first opposing wall wherein each slide switch is connected to one of the writing elements in order to enable a user to extend or retract the connected writing element through the respective corner of the housing via the slide switch; and a locking element connected to each slide switch for enabling each slide switch and the connected writing element to be locked in either the extended or retracted position.

* * * * *